United States Patent [19]

Grotz et al.

[11] Patent Number: 4,907,643
[45] Date of Patent: Mar. 13, 1990

[54] COMBINED HEAT EXCHANGER SYSTEM SUCH AS FOR AMMONIA SYNTHESIS REACTOR EFFLUENT

[75] Inventors: Bernard J. Grotz, Pasadena; Clive R. Good, Whittier, both of Calif.

[73] Assignee: C F Braun Inc., Alhambra, Calif.

[21] Appl. No.: 327,014

[22] Filed: Mar. 22, 1989

[51] Int. Cl.[4] .............................................. F28F 1/00
[52] U.S. Cl. ..................... 165/1; 165/134.1; 165/140; 165/145
[58] Field of Search ................. 165/1, 134.1, 140, 145

[56] References Cited
U.S. PATENT DOCUMENTS 4,193,447 3/1980 Fah ........................................ 165/145
4,620,588 11/1986 Pfouts ............................ 165/140 X Primary Examiner—Robert G. Nilson
Attorney, Agent, or Firm—Lyon & Lyon

[57] ABSTRACT

A combined heat exchanger particularly suited for ammonia converter reactor effluent is described. The combined exchanger includes a first exchanger and a high temperature heat sink, such as a steam superheater, within a single exchanger shell. In a preferred embodiment, gas leaving the ammonia converter is conveyed into a single pass tube bundle which comprises the feed-effluent exchanger section and then passes through a tubesheet which separates the feed effluent exchanger section from the steam superheater section, passing over a U-tube bundle which comprises the steam superheater section in the other part of the shell. Means are provided for protecting the shell in the steam superheater section adjacent the tubesheet.

26 Claims, 3 Drawing Sheets

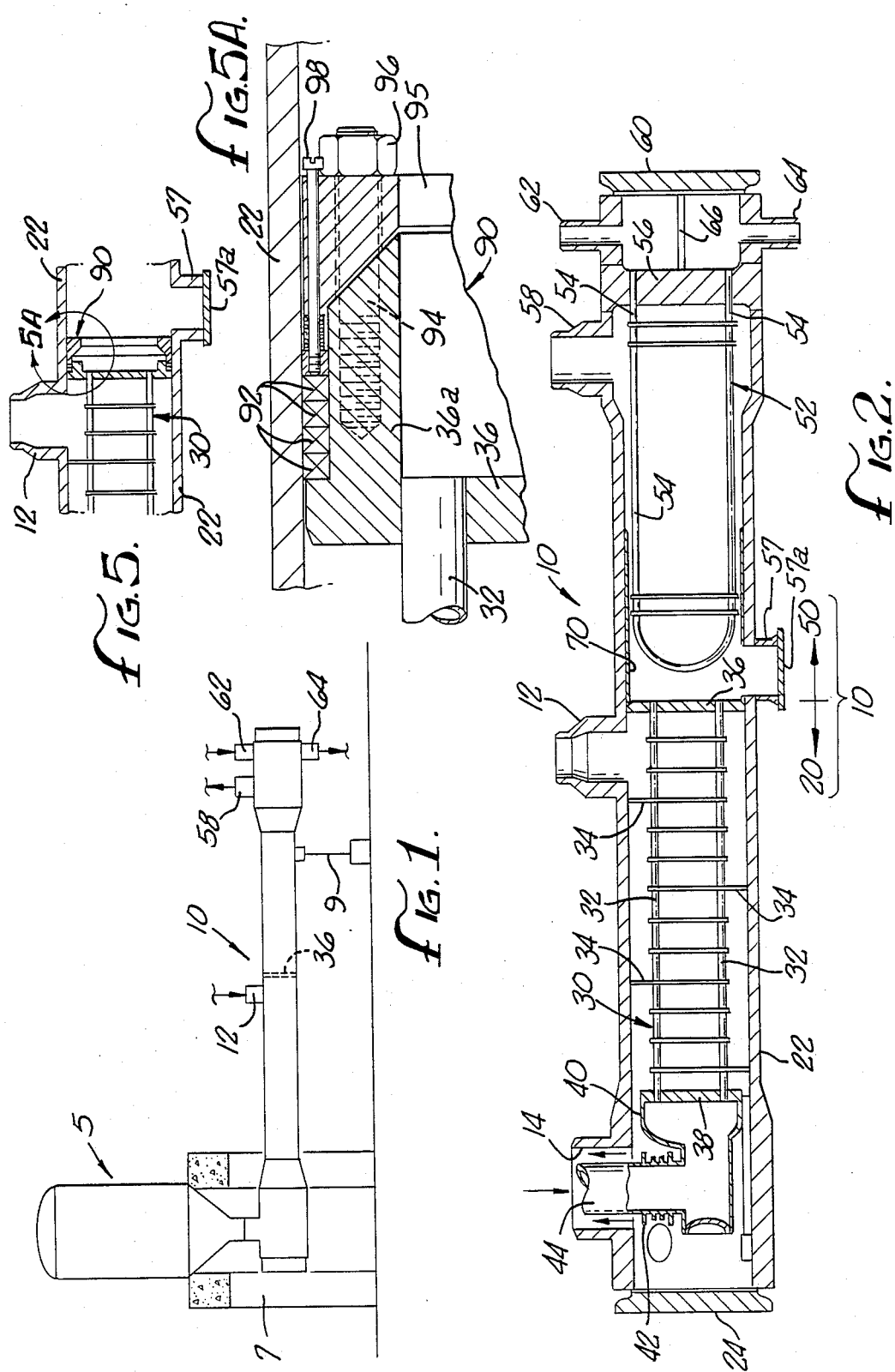

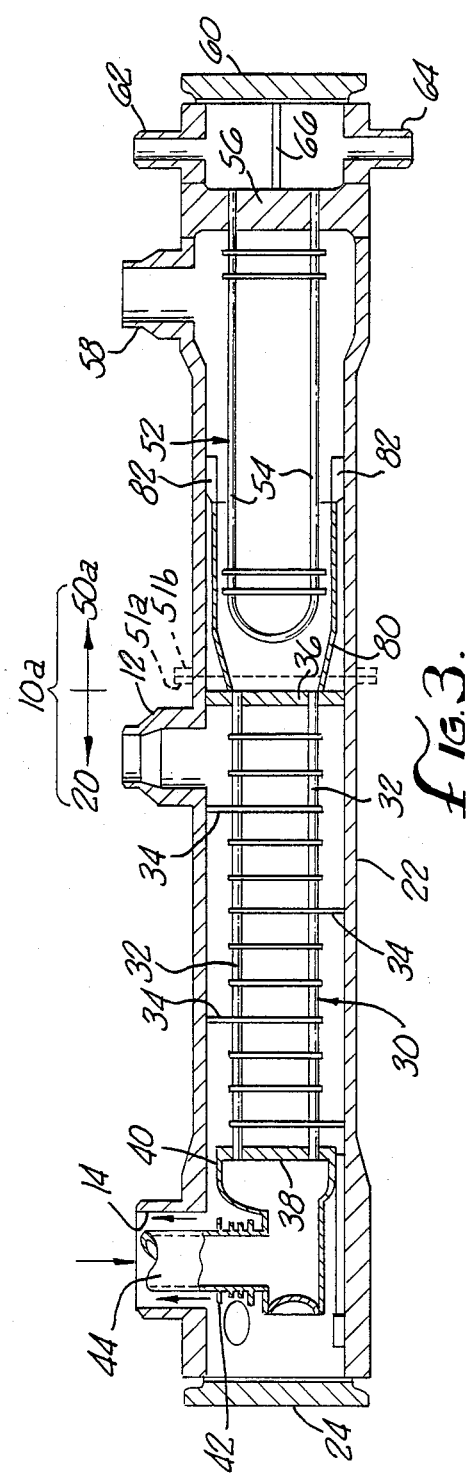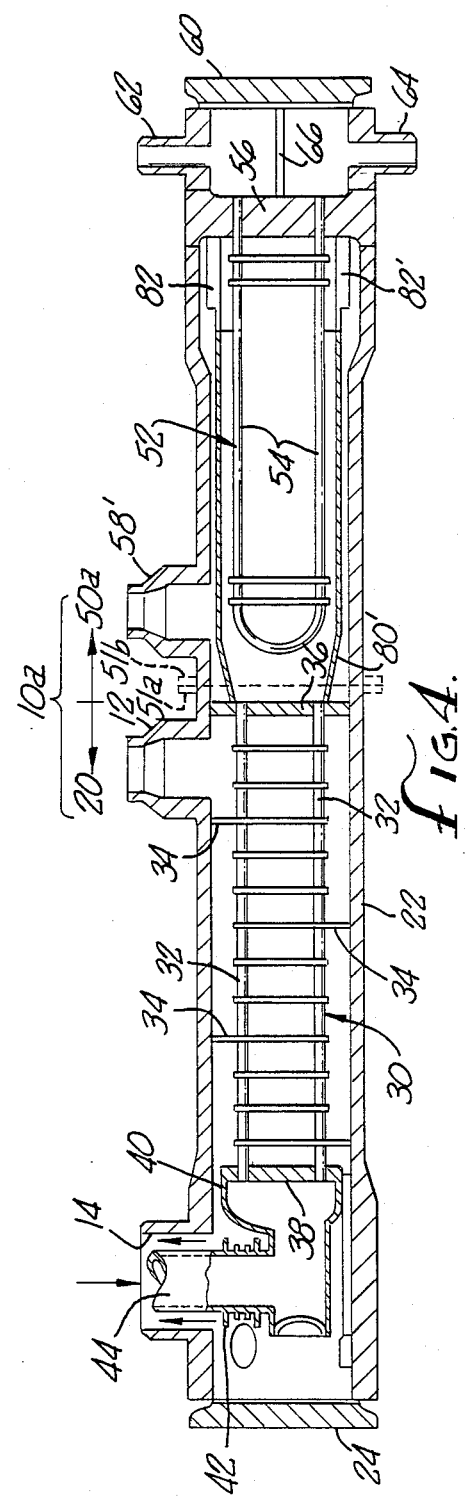

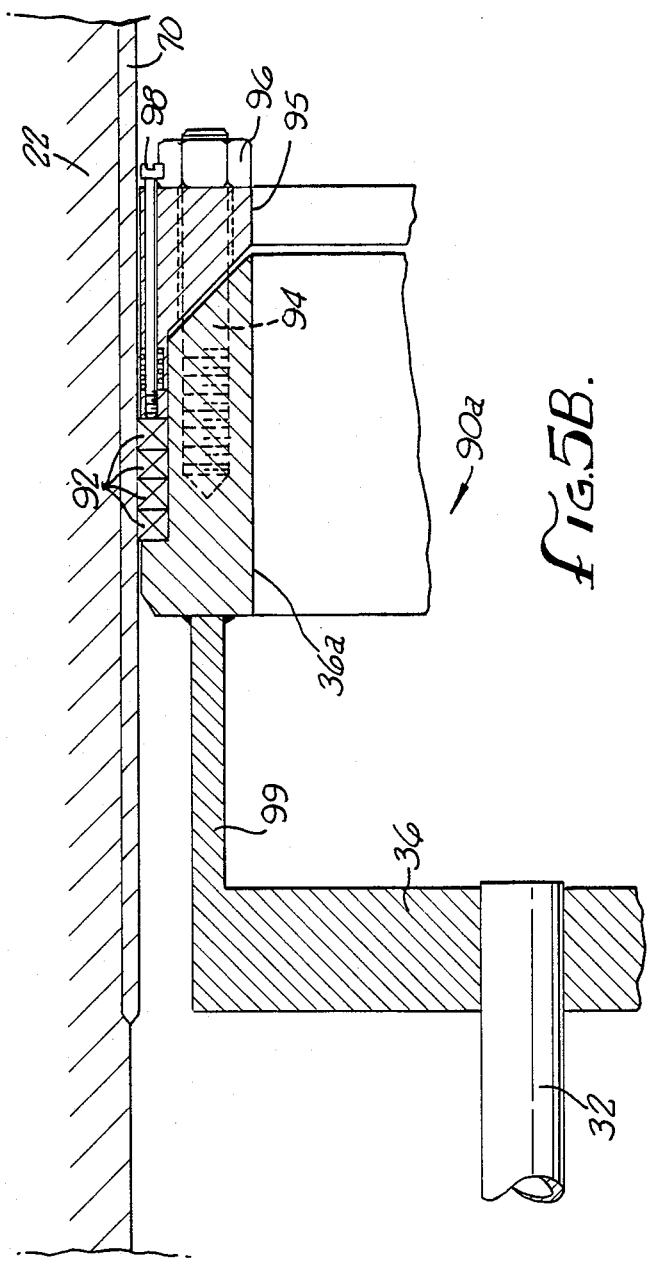

COMBINED HEAT EXCHANGER SYSTEM SUCH AS FOR AMMONIA SYNTHESIS REACTOR EFFLUENT

BACKGROUND OF THE INVENTION

The field of the present invention relates to heat exchangers and more particularly to heat exchanger systems in which a process fluid stream passes through two successive heat exchange steps where heat is exchanged between the fluid stream and two exchange fluids, and in which the operating conditions or physical properties such as temperature, corrosiveness, etc. of the fluid stream are aggressive with respect to ordinary materials of construction.

The successive exchange of heat between a fluid stream and two or more exchange fluids is practiced in many processes. The most common equipment configuration is a separate shell and tube heat exchanger for each exchange fluid with the fluid stream passing to successive exchangers through connecting pipes. For a typical shell and tube heat exchanger, the fluid stream may pass through either the shell side or the tube side of the exchanger, the best choice depending on the specific circumstances.

An example for successive heat exchange is found in an ammonia synthesis system such as that described in U.S. Pat. No. 4,744,966, where effluent gas (fluid stream) from a reactor is cooled in a first heat exchanger by exchange with reactor feed gas and then in a second exchanger by exchange with steam, the fluid stream flowing from the first exchanger to the second exchanger through connecting pipe.

When the conditions or properties such as temperature, corrosiveness, etc. of the process fluid are severe with respect to ordinary materials of construction, various designs are practiced to protect the shell of an exchanger from such an aggressive fluid.

Referring again to the specific example of U.S. Pat. No. 4,744,966, effluent gas from the first reactor leaves the reactor at a temperature between 480° and 540° C. and is conveyed into a first heat exchanger where it is cooled to a temperature between 390° and 440° C. by exchange with the feed gas to the first reactor. The effluent gas is then conveyed through a connecting pipe into a second heat exchanger where it is further cooled by exchange with steam. In this application the reactor effluent gas would normally be introduced into the tubes of the first exchanger by means of a connection such as that described in U.S. Pat. No. 4,554,135, to avoid subjecting the shell to the aggressive inlet gas. In the second exchanger, however, economics favor passing the gas through the shell side of the exchanger and the steam through the tube side.

It has been recognized by the inventors herein that at the lower part of the effluent gas temperature range, namely, below about 400° C., a thin wall connecting pipe made of chromiummolybdenum alloy steel can be used. However, in the upper part of this temperature range, to avoid nitriding of the metal, a more expensive design would be required, using a much thicker pipe wall or an overlay inside the pipe made of a nitridingresistant material such as Inconel ®. Regardless of the design, such high temperatures present difficulties in allowing for thermal expansion, differential expansion, maximum stresses and the protection of welded joints including a closing joint in welded construction.

SUMMARY OF THE INVENTION

The present invention is directed to heat exchangers and more particularly to heat exchanger systems in which a fluid stream is passed through two successive heat exchange steps in which heat is exchanged between the fluid stream and two exchange fluids, and in which the operating conditions or physical properties such as temperature, corrosiveness, etc. of the first fluid are aggressive to ordinary materials of construction. The inventors have recognized that the aggressiveness of the fluid varies as the fluid passes through the exchanger system. The present invention takes advantage of the varying aggressiveness and avoiding or mitigating problems associated with the aggressiveness and reducing equipment cost.

The invention is directed to a combined exchanger in which the two heat exchange steps are carried out in two tube bundles placed in a single shell, one bundle being of a single-pass configuration and the other bundle being of a multi-pass configuration with the inlet-outlet end of the multi-pass bundle positioned at one end of the shell away from the single-pass bundle, and with the fluid stream passing through the tube side of the single-pass bundle at its more aggressive condition and the shell side of the two-pass bundle at its less aggressive condition. Means are provided to keep the two exchange fluids separate in the two sections of the shell, and to protect the exchanger shell from the fluid stream in the multi-pass section.

BRIEF DESCRIPTION OF THE DRAWINGS

FIG. 1 diagrammatically illustrates a combined heat exchanger system in accordance with the present invention, as applied to the cooling of the effluent of an ammonia synthesis reactor;

FIG. 2 is a detailed cross-sectional view of a combined heat exchanger, including a protective overlay;

FIG. 3 is a cross-sectional view of an alternative combined exchanger having a protective shroud;

FIG. 4 is a cross-sectional view of another alternative combined exchanger having a protective shroud.

FIG. 5 illustrates in cross-section a portion of a combined heat exchanger including a packing gland;

FIG. 5A is a detailed view of the packing gland of FIG. 5; and

FIG. 5B illustrates in cross-section a portion of a combined heat exchanger including a thermal sleeve combined with a packing gland.

DETAILED DESCRIPTION OF PREFERRED EMBODIMENTS

The preferred embodiments will now be described with reference to the drawings. To facilitate description, any numeral representing an element in one figure will represent the same element in any other figure.

FIG. 1 is a diagrammatic view of a combined exchanger 10 according to the present invention which as an example is used to cool the effluent of ammonia synthesis reactor 5. The ammonia synthesis reactor 5 is vertically supported on reactor support 7 and is connected to the combined exchanger 10. The combined exchanger 10 is oriented horizontally and is supported by a brace 9 which permits axial movement to accommodate thermal expansion.

FIG. 2 illustrates details of the combined exchanger 10. The combined exchanger 10 has a first feed-effluent exchanger section 20 and a high temperature heat sink exchanger section 50 within shell 22, the two sections being separated by a tubesheet 36. Hot reacted gas from the reactor 5 passes through a conduit 44 into an exchanger head 40 of the first exchanger section 20 through an expansion means such as expansion joint 42. The first exchanger section 20 includes a tube bundle 30 extending between tubesheets 36 and 38. The hot reacted gas passes through the tubes 32 and through the tubesheet 36 into the shell side of the second exchanger section 50.

The reactor feed gas passes into the shell side of the first exchanger section 20 through the feed inlet 12 where it is heated by exchange with the hot reacted gas within the tubes 32. Feed gas is circulated in its path through the first exchanger section 20 by baffles 34. After being heated, the feed gas passes through an annulus 14 thereby entering the reactor 5.

In this example, the temperature of the reacted gas leaving the first exchanger section 20 is in a range of about 425° to 440° C. The second exchanger section 50 is comprised of a U-tube bundle 52 having a plurality of U-tubes 54. The reacted gas passes along the shell side of the U-tube bundle 52 and exits the gas outlet 58. The reacted gas is cooled by heat exchange with the steam within the U-tubes 54, thereby making high-temperature superheated steam. Low-temperature steam enters the U-tubes 54 through a steam-inlet 62 and exits through an outlet 64. The U-tubes 54 are secured within a tube-sheet 56. Incoming steam entering a head section 60 through the inlet 62 remains separated from the outlet 64 by pass partition 66.

Though the illustrated embodiment of the high temperature heat sink is comprised of a steam superheater, other high temperature fluid exchangers could be employed including a boiler feedwater exchanger, boiling water exchanger, or the like.

In the example of FIG. 2, the temperature of the effluent gas entering the second exchanger section 50 is in a temperature range of 425° to 440° C. To protect against nitriding in this range, a means for protecting the portion of the shell 22 nearest the tubesheet 36 is provided. An overlay 70 of a nitriding-resistant material such as Inconel® is added along the inside surface of the shell 22 from the tubesheet 36 for a sufficient distance along the length of the second exchanger section 50 where the effluent gas has been sufficiently cooled by heat exchange with the steam within the U-tubes 54 to a position where the effluent gas has fallen safely below about 425° C., a maximum temperature in nitriding service for which a thick walled chromium molybdenum alloy is suitable. In a more conservative embodiment the overlay 70 extends along a substantial portion of the length of the steam superheater section 50.

The steam superheater section 50 may also include a manhole 57 in the shell 22 downstream of the tubesheet 36 to permit access to the tubesheet 36 such as for inspection or maintenance. The manhole 57 is sealed off by cover 57a. Though not illustrated, both the manhole 57 and the cover 57a may be overlayed with a nitriding-resistant material.

FIG. 3 illustrates an alternative combined exchanger 10a in which an alternative second exchanger section 50a includes a different shell-protecting means comprising a shroud 80. Except for the protecting means of the shroud 80, in place of the overlay 70 of FIG. 2, design details of the combined exchanger 10a of FIG. 3 are identical to those of FIG. 2 and need not be repeated.

The shroud 80 is comprised of a cylindrical metal barrier being attached to the tubesheet 36 and extending axially between the shell 22 and the U-tube bundle 52. The shroud 80 isolates hot reacted gas exiting the tubes 32 of the first exchanger section 20 from the hotter part of outer shell 22. Shroud 80 is supported at the downstream end by support brackets 82.

FIG. 4 illustrates a more conservative alternative in which shroud 80' extends most of the length of tube bundle 52 and outlet nozzle 58 is located near the gas inlet end of exchanger section 50. The example shown in FIG. 4 provides annular passage between the shroud 80 and the shell 22 through which the cooled effluent gas flows, thereby maintaining the temperatures of shell 22 safely below 425° C. The shroud 80' is supported on the downstream end by support brackets 82'.

The steam superheater section of any of the embodiments may include break flanges to allow disassembly. In the example illustrated in FIGS. 3 or 4, the alternative steam superheater section 50a has included break flanges 51a and 51b, shown by dotted lines, so the steam superheater section 50a may be removed to permit access to the tubesheet 36.

Though not illustrated together, the overlay 70 of FIG. 2 may be combined with the shroud 80 of FIG. 3 (or with the shroud 80' of FIG. 4) to function in combination to protect the portions of the shell 22 being exposed to high temperature effluent gas.

Also included is a means for sealing the shell side of first exchanger section 20 from the shell side of second exchanger 50 to keep the fluids separated. One example is the tubesheet 36 being welded or otherwise attached to the shell 22 as in FIGS. 2, 3 or 4. A means may also be included to allow for thermal expansion of the tube bundle 30 such as an expansion joint.

The preferred means for sealing the tubesheet 36 to the shell 22 is the packing gland 90 illustrated in FIGS. 5 and 5A. Such sealing means also allows for the thermal expansion of the tube bundle 30.

The packing gland 90 seals off and isolates the tubesheet 36 against the exchanger shell 22. The tubesheet 36 is equipped with a cylindrical 36a forming an annular space therebetween into which the packing rings 92 are placed. The clamping ring 95 is attached to the tubesheet extended portion 36 by the head bolt 94 secured by the clamping nut 96. The packing bolt 98 passes through the clamping ring 95 adjustably compressing the packing rings 92 to provide the desired sealed pressure.

FIG. 5B illustrates another embodiment in which a thermal sleeve 99 is combined with a packing gland 90a on the outboard end of the thermal sleeve 99. (The elements of the packing gland 90a are the same as those of the packing gland 90 of FIG. 5A and are not repeated). This arrangement is particularly advantageous in that it is more flexible and is subjected to lower bending stresses, providing a better, more reliable seal.

Though the illustrated embodiments utilize U-bends in the two-pass bundle as a means of returning the fluid from the first pass to the second pass, other means may be employed such as a floating head.

Alternately, in another embodiment, a bundle of another even number of passes, such a four-pass bundle, may be employed instead of two-pass bundle.

The combined exchanger design illustrated and described eliminates the need for a connector pipe between adjacent exchangers. Such a connector pipe is subjected to thermal stresses and may require a nitriding-resistant overlay throughout its length. By combining exchangers within a single shell, difficulties due to high stresses resulting from thermal expansion and the problems of achieving reliable closing weld joints with a connector pipe which either has an overlay or is made entirely of a nitriding resistant material are minimized. Elimination of the connector pipe also minimizes the amount of material exposed to high temperature effluent. In one case, the use of the combined exchanger design was found to save about $200,000 in comparison to a design comprised of two separate exchangers.

In the embodiments described above, the fluid stream enters the exchanger at an elevated temperature and is cooled as it passes through the tubes of the single-pass tube section and then through the shell side of the two-pass tube section. In another embodiment, the fluid stream enters the exchanger at a relatively mild temperature and is heated to a more aggressive condition as it passes first through the shell side of the two-pass tube section and then through the tube side of the single-pass tube section, with means for protecting the shell in the two-pass tube section similar to the means described in previous embodiments.

In another embodiment, the fluid stream enters or leaves the exchanger at an aggressively cold temperature, with the exchanger configured and provided with protective means as described previously for hot gases.

Thus, a combined heat exchanger system has been disclosed which is particularly suitable for heat transfer with fluids in which the conditions or properties such as temperature, corrosiveness, etc. of the first fluid are aggressive to ordinary materials of construction, and in which the aggressiveness of the fluid varies as the fluid passes through the exchanger system, and particularly suitable for cooling the effluent of an ammonia synthesis reaction.

While embodiments and applications of this invention have been shown and described, it would be apparent to those skilled in the art that further uses and modifications are possible without departing from the inventive concepts herein. The invention, therefore, is not to be restricted except in the spirit of the claims that follow.

We claim:

1. An ammonia converter effluent heat exchanger comprising:
   a shell;
   a feed-effluent exchanger portion comprising a first tubular exchanger section within said shell;
   a high temperature heat sink portion comprising a second tubular exchanger section within said shell;
   a tubesheet separating said feed-effluent portion from said high temperature heat sink portion;
   a bundle of heat exchange tubes supported within said feed-effluent portion, said tubes terminating in said tubesheet such that said high temperature heat sink portion is directly connected in series to said feed-effluent portion; and
   means within said shell for protecting said shell in said high temperature heat sink portion near to said tubesheet.

2. The system of claim 1 wherein said means for protecting said shell comprises a protective internal shroud interposed between said shell and said second tubular exchanger section separating incoming effluent gas from said shell.

3. The exchanger of claim 2 wherein said protective internal shroud extends along said two-pass tube exchanger section for a length sufficient to protect that part said shell which would otherwise be exposed to unacceptably aggressive conditions.

4. The exchanger of claim 2 wherein said protective internal shroud extends along substantially the entire length of said two-pass tube exchanger section.

5. The exchanger of claim 1 wherein said means for protecting said shell comprises a protective overlay on a part of the inside surface of said shell in the two-pass tube exchanger section in which would otherwise be exposed to unacceptably aggressive conditions.

6. The exchanger of claim 5 wherein said protective overlay is made of nitriding resistant material.

7. The exchanger of claim 5 wherein said protective overlay is made of Inconel ®.

8. The exchanger of claim 5 wherein the means for protecting said shell further comprises a short thermal sleeve interposed between said shell and incoming effluent gas.

9. The exchanger of claim 1 wherein said high temperature heat sink is selected from the group consisting of: steam superheater, boiler feedwater exchanger, and boiling water exchanger.

10. The exchanger of claim 1 wherein said shell is dividable into two sections with a connection means between the feed-effluent exchanger portion and the high temperature heat sink portion.

11. The exchanger of claim 10 wherein said connection means comprises break flanges.

12. The exchanger of claim 10 wherein said connection means comprises a packing gland.

13. The exchanger of claim 1 wherein said second tubular exchanger section comprises a multi-pass bundle having an even number of passes.

14. The exchanger of claim 1 wherein said high temperature heat sink comprises a high temperature fluid exchanger.

15. In an ammonia synthesis converter system having a shell and catalyst holder coupled through a channel to a heat exchanger and a conduit extending through the channel, the heat exchanger comprising:
    a shell;
    a feed-effluent exchanger portion comprising a first tubular exchanger section;
    a high temperature heat sink portion comprising a second tubular exchanger section having exchanger tubes;
    a tubesheet separating said feed-effluent portion from said high temperature heat sink portion;
    a bundle of heat exchange tubes supported within said feed-effluent portion, said tubes terminating in said tubesheet such that said high temperature heat sink portion is directly connected in series to said feed effluent portion; and
    means within said shell for protecting said shell in said high temperature heat sink portion adjacent to said tubesheet.

16. The exchanger of claim 15 wherein the means for protecting said shell comprises a protective internal shroud interposed between said shell and the exchanger tubes of said second tubular exchanger section.

17. The exchanger of claim 15 wherein said means for protecting said shell comprises a protective overlay on a part of the inside surface of said shell exposed to high temperature reactor effluent gas.

18. The exchanger of claim 17 wherein said protective overlay is made of nitriding resistant material.

19. The exchanger of claim 17 wherein said means for protecting said shell further comprises a short thermal sleeve interposed between said shell and incoming effluent gas.

20. The exchanger of claim 15 wherein said high temperature heat sink is selected from the group consisting of: steam superheater, boiler feedwater exchanger, and boiling water exchanger.

21. The exchanger of claim 15 wherein said high temperature heat sink portion is connected to said feed effluent portion by break flanges.

22. The exchanger of claim 21 wherein said second tubular exchanger section comprises a multi-pass bundle having an even number of passes.

23. The exchanger of claim 15 wherein said second tubular exchanger section comprises a multi-pass bundle of an even number of passes.

24. The exchanger of claim 15 wherein said high temperature heat sink comprises a high temperature fluid exchanger.

25. The exchanger of claim 15 wherein said high temperature heat sink portion is connected to said feed effluent portion by a packing gland.

26. A process for heat exchanger system for cooling or heating a fluid stream of process fluid, comprising the steps of:
  passing the fluid stream through two heat exchange steps in series, comprising exchanging heat between the fluid stream and a first exchange fluid by passing the fluid stream through a tube side of a single pass bundle, and exchanging heat between the fluid stream and a second exchange fluid by passing the fluid stream through a shell side of a multi-pass bundle, wherein the first and second tube bundles are placed in a single shell;
  separating the fluids in respective shell sides of the two heat exchange steps by a tubesheet of the single pass bundle and providing a means to seal between the tubesheet and the shell;
  orienting a flow scheme such that operating conditions and/or physical properties of the process fluid in the shell side of the multi-pass bundle is more aggressive at an end nearer the tubesheet of said single pass bundle than at an end farther from the single pass bundle; and
  protecting the shell from the process fluid at the more aggressive condition of the process fluid.

* * * * *